July 13, 1926.
P. JARAY
AIRSHIP
Filed June 28, 1920
1,592,301
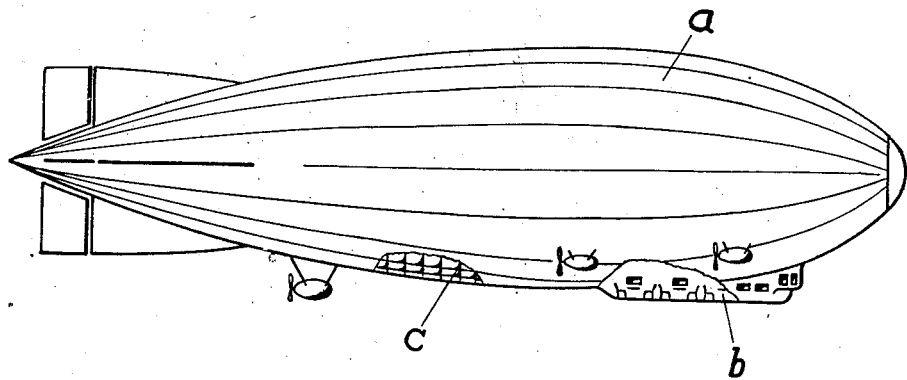
INVENTOR
Paul Jaray Patented July 13, 1926.

1,592,301

UNITED STATES PATENT OFFICE.

PAUL JARAY, OF FRIEDRICHSHAFEN, GERMANY, ASSIGNOR TO LUFTSCHIFFBAU ZEPPELIN GESELLSCHAFT MIT BESCHRANKTER HAFTUNG, OF FRIEDRICHSHAFEN, GERMANY, A GERMAN CORPORATION.

AIRSHIP.

Application filed June 28, 1920, Serial No. 392,571, and in Germany April 3, 1920.

My invention refers to airships and more especially to passenger airships designed for long distance travelling and its particular object is to simplify the steering of such airships.

As is well known, owing to the radiation from the sun at day-time and the heating of the gas caused thereby, the airship has a greater buoyancy and therefore tends to rise. In consequence thereof it becomes necessary to drive the airship down by the head in order to keep it at the same height. By doing so a dynamic downwards pressure is obtained and unnecessary losses of gases are obviated. The conditions arising at night are contrary to those explained above.

In order now, to do away as far as possible with the disagreeable differences between the trim of the airship at day and at night, a novel distribution of the cabins designed to take up the passengers is resorted to. To this end the passengers' sleeping-rooms are disposed, according to the present invention, relatively to the passenger rooms to be used at day-time in such a manner that during day-time the bow and during the night the stern is down.

In the drawings affixed to this specification and forming part thereof, an airship embodying my invention is illustrated by way of example.

The gas cell $a$ carries a passenger car directly fixed to it, said car comprising a room $b$ to be used during day-time and a sleeping-room or rooms $c$ disposed further astern.

I claim:—

1. In an airship in combination a passenger room for day sojourn and a passenger room for night's rest, said rooms being so arranged in relation to each other that a passenger going to bed at night will by this dislocation of his weight cause an upward weight moment in the ship's trim, thereby working towards compensation for the difference of buoyancy between day and night conditions.

2. Passenger accommodations in an airship comprising a space for day time sojourn of a passenger and another space for his night's rest, said second space being situated astern from said first space, thereby providing for automatic shifting of the passenger's weight at nightfall and at daybreak and counteracting the influence of day and night conditions on the airship's buoyancy.

In testimony whereof I affix my signature.

PAUL JARAY.